United States Patent [19]

Kobayashi et al.

[11] Patent Number: 4,686,591
[45] Date of Patent: Aug. 11, 1987

[54] TAPE LOADING DEVICE FOR A RECORDING AND/OR REPRODUCING APPARATUS

[75] Inventors: Junji Kobayashi, Tokyo; Hisashi Nakano, Kanagawa, both of Japan

[73] Assignee: Canon Kabushiki Kaisha, Tokyo, Japan

[21] Appl. No.: 686,650

[22] Filed: Dec. 27, 1984

[30] Foreign Application Priority Data

Dec. 27, 1983 [JP] Japan .................... 58-251399
Dec. 27, 1983 [JP] Japan .................... 58-251400
Jan. 23, 1984 [JP] Japan .................... 59-010651

[51] Int. Cl.$^4$ .................. G11B 15/00; G11B 15/665
[52] U.S. Cl. .................. 360/85; 360/95; 360/69
[58] Field of Search .......... 360/69, 71, 83–85, 360/95, 93, 73

[56] References Cited

U.S. PATENT DOCUMENTS

| | | | |
|---|---|---|---|
| 3,740,495 | 6/1973 | Kihara | 360/85 |
| 4,470,086 | 9/1984 | Maeda | 360/85 |
| 4,481,551 | 11/1984 | Maeda | 360/85 |
| 4,561,029 | 12/1985 | Maeda | 360/85 |

Primary Examiner—Raymond F. Cardillo
Assistant Examiner—Steven R. Garland
Attorney, Agent, or Firm—Toren, McGeady & Associates

[57] ABSTRACT

A recording and/or reproducing apparatus including a tape loading mechanism used for controlling the speed at which the tape is loaded from the container to the rotary head or unloaded from the rotary head into the container.

4 Claims, 11 Drawing Figures

TAPE LOADING DEVICE FOR A RECORDING AND/OR REPRODUCING APPARATUS

BACKGROUND OF THE INVENTION

1. Field of the Invention

This invention relates to a recording and/or reproducing apparatus having a loading device for moving record bearing medium guiding means to a predetermined position in response to movement of loading means which is movable for loading recording and/or reproducing means with a tape shaped record bearing medium.

2. Description of the Prior Art

The automatic loading device which is employed, for example, in a video cassette recorder (called VCR for short) is arranged as follows: In a tape loading, a loading post and a tape guide member, which are disposed behind the tape within a cassette, are first moved by the rotation of a loading ring in the loading direction. The tape is pulled out from the cassette by the movement of these members. The tape is thus wound around a tape guide drum on which a rotating head is mounted. The tape is placed on a fixed tape guide member. Signal recording or reproduction is performed by the rotating head when the tape is advanced under this condition.

In a tape unloading, a loading ring is rotated in an unloading direction. Then, the tape, which is put on the loading post and the tape guide member, is wound up by a reel which is arranged to be rotated by a driving motor. The unloading process includes a part in which the tape guide member moves to a great extent. When the tape guide member thus moves to a great extent, if the reel is rotated at a constant speed, the amount of tape to be wound up increases and becomes larger than an amount of tape that can be taken up by the reel. This results in a slackened state of a tape portion yet remaining to be taken up. Such a slack state of tape causes damage of the tape and a malfunction of the loading device.

To solve this problem, various methods are considered including a method in which: A reel base for rotating the reel is provided with a torque limiter device and the tape is taken up by rotating the reel base with the rotating speed of the reel base increased to cause a driving member to slip on the reel base, so that a larger amount of tape can be taken up on the reel. In another method, the rotating speed of a loading ring driving motor is arranged to be low from the beginning to prevent the tape from slackening during the tape unloading process. However, the former method necessitates complex arrangement while the latter requires an excessively long time for unloading the tape.

Further, in the tape loading, an excessive tension would be given to the tape in the event that the above-stated tape guide member happens to move to a great extent in the early stage of the tape loading process. Since, at the beginning of a tape loading process, the reel is in repose, if the tape is suddenly pulled under that condition, a large load is imposed on the tape by the mass of a reel and a roll of tape wound there-around. The excessive tension then tends to bring about undesirable results, such as elongation of the tape, etc.

This problem can be solved by lowering the rotating speed of the loading ring. In that event, however, a long period of time becomes necessary for loading.

SUMMARY OF THE INVENTION

It is therefore an object of this invention to provide a recording and/or reproducing apparatus which is arranged to adequately protect a record bearing medium even when record bearing medium guide means moves to a great extent in response to loading means in unloading and/or loading a record bearing medium on recording and/or reproducing means and yet the arrangement shortens a period of time required for unloading and/or loading.

Under this object, each of recording and/or reproducing apparatuses, which embody varied aspects of this invention using a tape shaped record bearing medium housed in a container equipped with wind-up means, comprises: Recording and/or reproducing means; loading means which is movable to pull out the record bearing medium from the container for loading the recording and/or reproducing means with the record bearing medium; guide means arranged to move to a predetermined position in response to the loading means and to guide the pulled out portion of the record bearing medium; first drive means for driving the loading means; a second drive means for driving the wind-up means to wind up the record bearing medium; and control means for decreasing the moving speed of the loading means at least either when the guide means is moved from the predetermined position to the original position thereof by the movement of the loading means in an unloading direction or when the guide means is moved from the original position to the predetermined position by the movement of the loading means in a loading direction.

It is a more specific object of the invention to provide a recording and/or reproducing apparatus wherein, in case that record bearing medium guide means, which is responsive to loading means, moves to a great extent at the time of unloading, a record bearing medium can be satisfactorily taken up without slackening and yet unloading can be promptly accomplished.

To attain this object, a recording and/or reproducing apparatus, embodying an aspect of this invention using a tape shaped record bearing medium housed in a container which is equipped with wind-up means, comprises: Recording and/or reproducing means; loading means which is movable to pull out the record bearing medium from the container for loading the recording and/or reproducing means with the record bearing medium; guide means arranged to move to a predetermined position in response to the loading means and to guide the pulled out portion of the record bearing medium; first drive means for driving the loading means; a second drive means for driving the wind-up means to wind up the record bearing medium; and control means for increasing the winding up speed of the wind-up means when the guide means begins to move toward the original position thereof in response to the movement of the loading means in the unloading direction.

A recording and/or reproducing apparatus according to this invention is thus arranged to enhance the safety of a record bearing medium and yet is capable of promptly accomplishing unloading and/or loading operations even in cases where the record bearing medium guide means, which is interlocked with loading means, moves to a great extent during a record bearing medium unloading and/or loading operation on recording and/or reproducing means.

These and further objects and features of the invention will become apparent from the following detailed description of preferred embodiments thereof taken in connection with the accompanying drawings.

BRIEF DESCRIPTION OF THE DRAWINGS

Preferred embodiments of this invention are arranged as shown in the accompanying drawings in which:

FIG. 1 is a plan view showing the tape loading mechanism in a state at the start of unloading or in a state of having completed a loading operation;

FIG. 2 is a plan view showing the mechanism in a state of nearly completing the unloading operation or in a state soon after the start of the loading;

FIG. 3 is a plan view showing the mechanism in a state of having completed the unloading or in a state at the start of the loading; and FIG. 4 is a side view showing relative vertical positions of levers arranged to move movable tape guides.

DETAILED DESCRIPTION OF THE PREFERRED EMBODIMENTS

Figure 1:
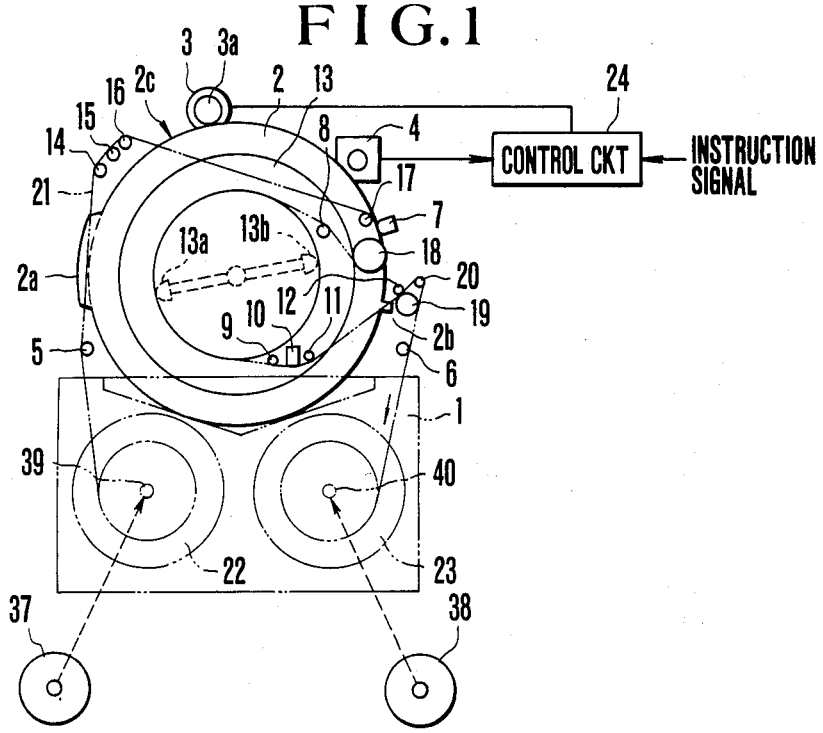
FIGS. 1 to 4 show a tape loading mechanism commonly employed in three embodiments of the invention. Of these drawings.
Figure 2:
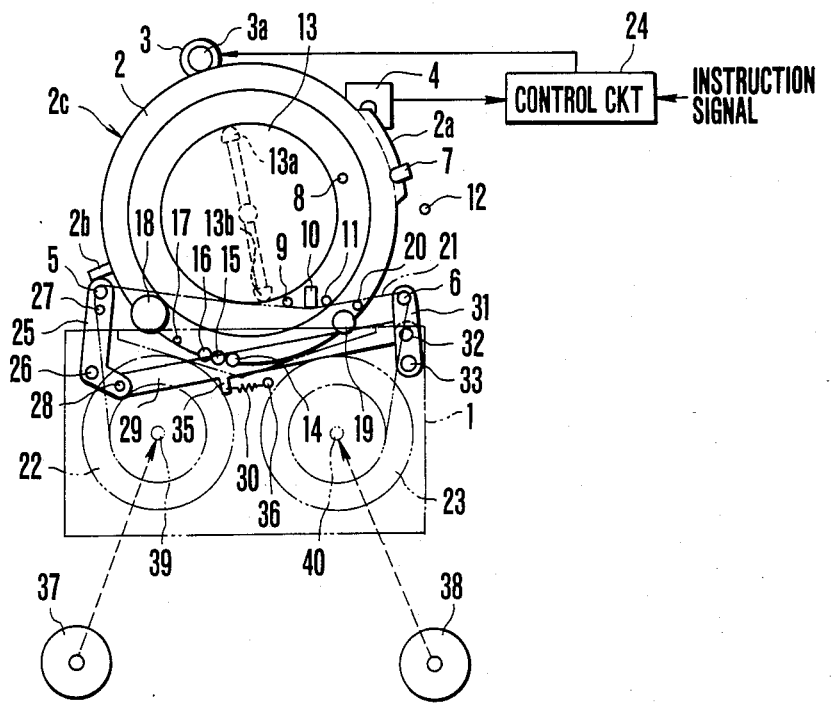
Figure 3:
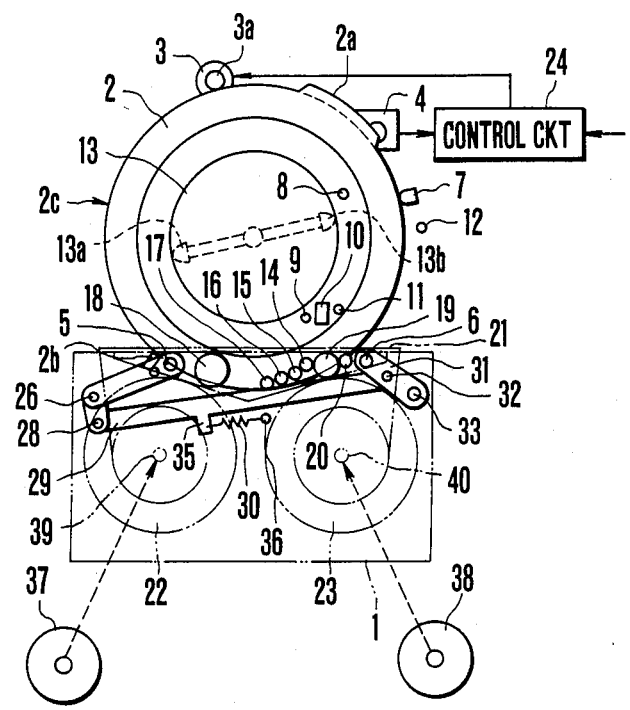
Figure 4:
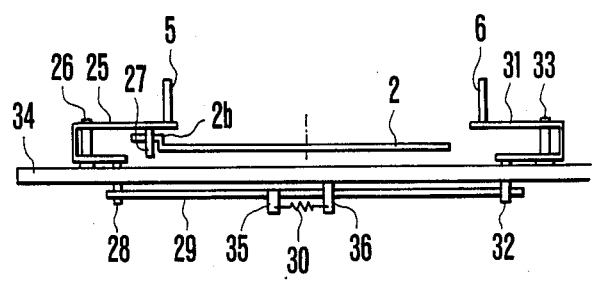

FIGS. 1–4 show a tape loading mechanism commonly employed in first, second and third embodiments of the present invention, in which the invention is applied to VCRs. Referring to FIG. 1, a video cassette 1 serves as a record bearing medium container housing a magnetic tape 21 which is a tape shaped record bearing medium. The tape 21 is wound around a supply reel 22 and a take-up reel 23, at least one of which is winding means. A loading ring 2 forms a part of loading means together with loading posts 17, 18 and 20 and is provided with a cam 2a which is formed within a predetermined angular range along the periphery of the loading ring 2 and a projection 2b which is formed in a predetermined position. The loading ring 2 is disposed around a rotary drum assembly 13 which is recording and/or reproducing means having a pair of rotatable recording-/reproducing magnetic head 13a and 13b. A loading motor 3 serves as drive means for driving the loading ring 2. A gear 3a, which is secured to the output shaft of the motor 3, engages a gear 2c which is provided on the periphery of the loading ring 2. The loading ring 2 is rotatable both in loading and unloading directions by the motor 3. A detection switch 4 is arranged to detect a predetermined rotation range of the loading ring 2. The switch 4 produces a detection signal by engaging the cam 2a within a rotation range of the loading ring 2 between the different positions of the ring 2 shown in FIGS. 2 and 3, that is, within the rotation range of the loading ring 2 in which tape guides 5 and 6, which will be described later, move in response to the loading ring 2. This detection signal is arranged to be supplied to a control circuit 24 which controls the rotating direction and speed of the motor 3. An erasing head 7 is arranged to erase a signal recorded on the tape 21. A fixed head 10 is arranged to record or reproduce an audio signal, a control signal or a cue signal. Tape guides 8, 9 and 11 are fixed on a chassis 34 which is shown in FIG. 4. Tape guides 5 and 6 are tape guide means arranged to move in association with the rotation of the loading ring 2 between their positions shown in FIGS. 1 and 2 and other positions shown in FIG. 3. Tape stretching moving posts 14, 15 and 16 are arranged to move also in association with the rotation of the loading ring 2 between their positions shown in FIG. 1 and other positions shown in FIG. 3. Loading posts 17, 18 and 20 are arranged to move between their positions shown in FIGS. 1 and 3 accordingly, the loading ring 2 rotates and form loading means together with the loading ring 2. The illustration includes a capstan 12 and a pinch roller 19 which is arranged to move together with the loading post 20.

An L shaped lever 25 has the movable tape guide 5 erected on the upper side of the fore end thereof. A shaft 26 is arranged to have the lever 25 turn thereon. A pin 27 is secured to the lower side of the lever 25 and is arranged to abut on the projection 2b provided on the periphery of the loading ring 2. A lever 31 has the movable tape guide 6 erected on the upper side of the fore end thereof. A shaft 33 is arranged to have the lever 31 turn thereon. The levers 25 and 31 are connected with each other through pins 28 and 32 provided on both sides of an intermediate lever 29. A spring 30 is arranged between a projection 35, provided at a part of the intermediate lever 29, and a pin 36 erected on the chassis 34 (FIG. 4). The spring 30 urges the intermediate lever 29 to move to the right, i.e. in the direction in which the levers 25 and 31 turn to the left and right, respectively, farther away from each other.

Under the loading completed condition (FIG. 1) of the loading mechanism which is arranged as described above, the tape 21 is stretched on the fixed tape guides 8, 9 and 11, the moving posts 14, 15 and 16, the loading posts 17, 18 and 20 and the movable tape guides 5 and 6 and is thus wound around the rotary drum assembly 13 by a predetermined angular degree. Further, under this condition, the erasing head 7 and the fixed head 10 are respectiely in contact with the tape 21. Signal recording or reproduction can be accomplished in a known manner, that is, by rotating the heads 13a and 13b and the capstan 12; by pressing the pinch roller 19 against the capstan 12 across the tape 21 to advance the tape 21; and by driving the take-up reel 23 with the reel driving motor 38 to wind up the tape 21.

When an unloading operation begins in response to an unloading instruction signal received under this condition, the loading motor 3 rotates clockwise at a predetermined speed under the control of the control circuit 24. This causes the loading ring 2 to turn counterclockwise. The counterclockwise rotation of the loading ring 2 causes the loading posts 17, 18 and 20, the pinch roller 19, the moving posts 14, 15 and 16 and the movable tape guides 5 and 6 to begin to move toward their original positions. The length of the tape path begins to shorten. A slackened portion of the tape resulting from this is taken up by at least either the supply reel 22 or the take-up reel 23 which are arranged to be rotated by the reel drive members or spindles 39 and 40 driven, respectively, by the reel driving motors 37 and 38 which are arranged below the cassette 1.

During a period of time between the state at the start of unloading shown in FIG. 1 and a state of nearly completing the unloading operation as shown in FIG. 2, the length of the tape path defined by the movable tape guides 5 and 6, the moving posts 14, 15 and 16 and the loading posts 17, 18 and 20 changes solely dependent on the loading posts 17 and 18 which move in the ratio of 1 : 1 to the rotation of the loading ring 2. Therefore, with the tape take-up amount of the supply reel 22 and-/or that of the take-up reel 23 arranged to be somewhat larger than the amount of the change in length of the tape path which takes place during this period, that is, with the rotating speed of the reel driving motors 37 and/or 38 set at a little higher speed, the tape can be taken up by the supply reel 22 and/or take-up reel 23 without slackening.

However, during a next period between the state of nearly completing the unloading operation of FIG. 2 and the state of having completed the unloading operation as shown in FIG. 3, the tape guides 5 and 6, which are arranged to move to a great extent, come to move. Therefore, during this period, the change in length of the tape path defined by the movable tape guides 5 and 6 naturally becomes greater than before. Such being the situation, the tape 21 would come to have a portion slackened and incompletely taken up if the loading ring 2 continues to be rotated at the same predetermined speed by the motor 3 during the above-stated period.

To solve this problem, the first embodiment of this invention is arranged as follows: The rotation range detecting switch 4 is arranged to detect, via the cam 2a which moves together with the loading ring 2, the arrival of the loading ring 2 at a point where the movable tape guides 5 and 6 begin to move toward the cassette 1. Upon detection of this, the switch 4 produces a detection signal. In response to this signal, the control circuit 24 lowers a voltage applied to the motor 3. The lowered voltage lowers the speed of the motor 3. This in turn lowers the rotating speed of the loading ring 2.

Then, the projection 2b provided on the loading ring 2, which is now rotating at a lower speed, comes to abut on the pin 27 of the L-shaped lever 25 on which the movable tape guide 5 is mounted. The loading ring 2 thus causes, via the pin 27, the lever 25 to slowly turn clockwise on the shaft 26. An opening angle defined by the lever 25 then gradually narrows to move thereby the movable tape guide 5 toward the cassette 1. This causes the intermediate lever 29 to move to the left against the force of the spring 30 arranged between the pin 36 on the chassis 34 and the intermediate lever 29. The leftward movement of the lever 29 causes the lever 31, on which the movable tape guide 6 is mounted, to turn counterclockwise on the shaft 33. The movable tape guide 6 then gradually moves toward the cassette 1.

The length of the tape portion to be taken up per unit time by the supply reel 22 and/or the take-up reel 23 normally increases when the movable tape guides 5 and 6 move toward the cassette 1 as mentioned in the foregoing. Whereas, in accordance with the above-stated arrangement of the first embodiment of this invention, the rotating speed of the loading ring 2 is then lowered to slow down the movement of the movable tape guides 5 and 6, so that the tape 21 can be satisfactorily taken up on the supply reel 22 and/or the take-up reel 23 without slackening as the changing rate per unit time of length of the tape path is decreased.

The loading ring 2 continues to rotate at the lowered speed until the completion of unloading as shown in FIG. 3. In the meantime, the tape 21 is taken up on the supply reel 22 and/or the take-up reel 23; and the movable tape guides 5 and 6 are placed back inside the cassette 1 after the loading posts 17, 18 and 20, the pinch roller 19 and the moving posts 14, 15 and 16 are moved back to their original positions. The position of the loading ring 2 at the completion of unloading is detected by a detecting device (not shown). A detection signal thus obtained then cuts off the unloading instruction signal which has been applied to the control circuit 24. The control circuit 24 cuts off power supply to the motor 3 to stop it from rotating. The arrangement of the control circuit 24 will be described later with reference to FIG. 5.

In the case of tape loading with a loading mechanism of the kind arranged as described above, the movable tape guides 5 and 6 move to a great extent at the initial stage of tape loading and at this stage, the supply reel 22 and the take-up reel 23 are stationary states. As a result of this, the mass of these reels 22 and 23 together with the tape 21 wound around them imposes a load on the tape portion being pulled out of the cassette 1. A large tension is thus suddenly applied to the tape 21 which may bring about undesirable results, such as elongation of the tape, etc.

A second embodiment of this invention is arranged to solve this problem in the following manner: In tape loading, a rotation range of the loading ring 2, from the loading start position thereof shown in FIG. 3 to a point where the movable tape guides 5 and 6 come to their predetermined positions shown in FIG. 2, is detected via the cam 2a of the loading ring 2 by means of the rotation range detecting switch 4. The control circuit 24 is arranged to reduce the speed of the motor 3 within this rotation range, so that the ring 2 rotates at a lowered speed within this range. More specifically, when the motor 3 rotates counterclockwise from the unloading completed condition, as shown in FIG. 3, under the control of the control circuit 24 operating according to a loading instruction signal, the loading ring 2 is rotated clockwise. The projection 2b of the ring 2 then moves in the same direction. Therefore, the L shaped lever 25 is caused, by the force of the spring 30 attached to the intermediate lever 29, to turn counterclockwise following the clockwise movement of the projection 2b. This, in turn, causes the intermediate lever 2 to move to the right. The rightward movement of the lever 29 causes the lever 31 to turn clockwise. Accordingly, the movable tape guides 5 and 6 pull the tape 21 out of the cassette 1. Meanwhile, the loading ring 2 rotates at the low speed from the position shown in FIG. 3 to the position shown in FIG. 2 until the movable tape guides 5 and 6 reach their predetermined positions. This arrangement enables the movable tape guides 5 and 6 to gently pull out the tape 21 from the cassette 1 without suddenly applying an unreasonable tension to the tape 21.

When the loading ring 2 passes the position of FIG. 2, the cam 2a moves away from the rotation range detecting switch 4. Therefore, the control circuit 24 increases the rotating speed of the motor 3. Accordingly, the loading ring 2 rotates at an increased speed toward the loading completed position of FIG. 1. When the loading ring 2 reaches the position shown in FIG. 1, the loading instruction signal is cut off and the control circuit 24 brings the motor 3 to a stop.

In loading, as mentioned above, the rotation of the motor 3 and, accordingly, that of the loading ring 2 are decelerated within the range of the rotation of the loading ring 2 from the position of FIG. 3 to the position of FIG. 2. Therefore, in accordance with the arrangement of the second embodiment of this invertion, the movable tape guides 5 and 6 pull out the tape 21 at a low speed in tape loading, so that the tape 21 can be effectively prevented from having an excessive tension. The details of arrangement of the control circuit 24 of the second embodiment will be described later with reference to FIG. 6.

A third embodiment of this invention combines the first and second embodiments mentioned in the foregoing. In this case, the rotating speed of the loading ring 2 is arranged to be lowered between the position of FIG. 3 and the position of FIG. 2 both in unloading the tape 21 and in loading the tape 21. The third embodiment thus gives both the advantages of the first and second embodiments. The arrangement of the control circuits 24 of the third embodiment will be described later with reference to FIG. 7.

Figure 5:
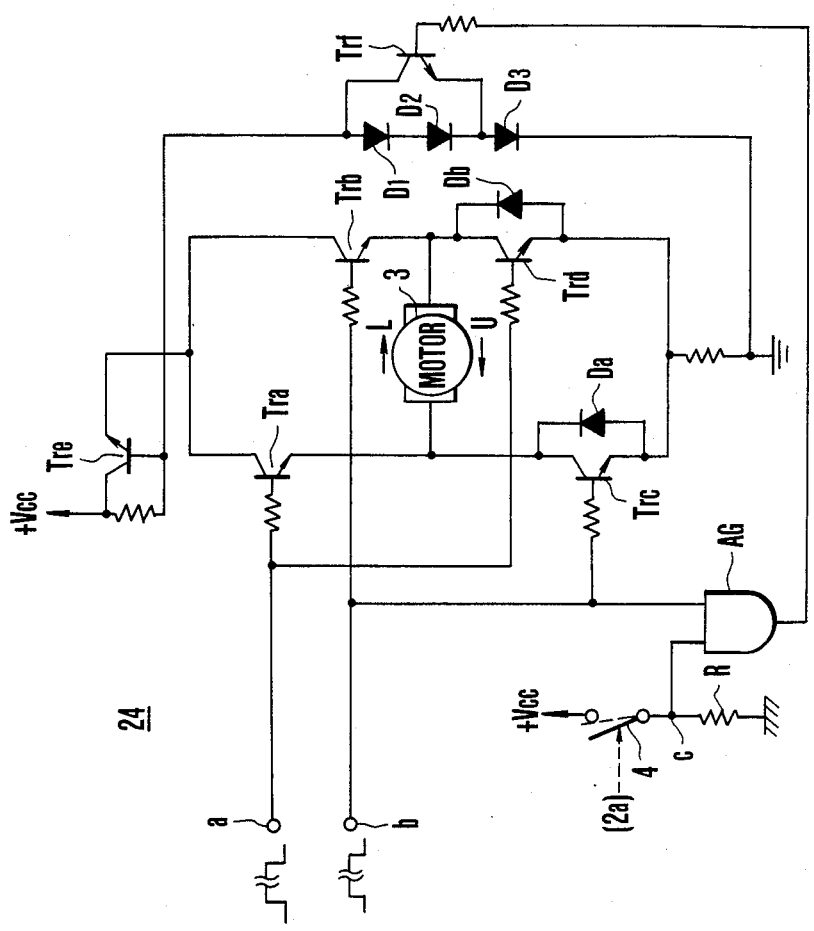
FIGS. 5 to 7 show a loading motor control circuit arranged for first, second and third embodiments of this invention.
Figure 6:
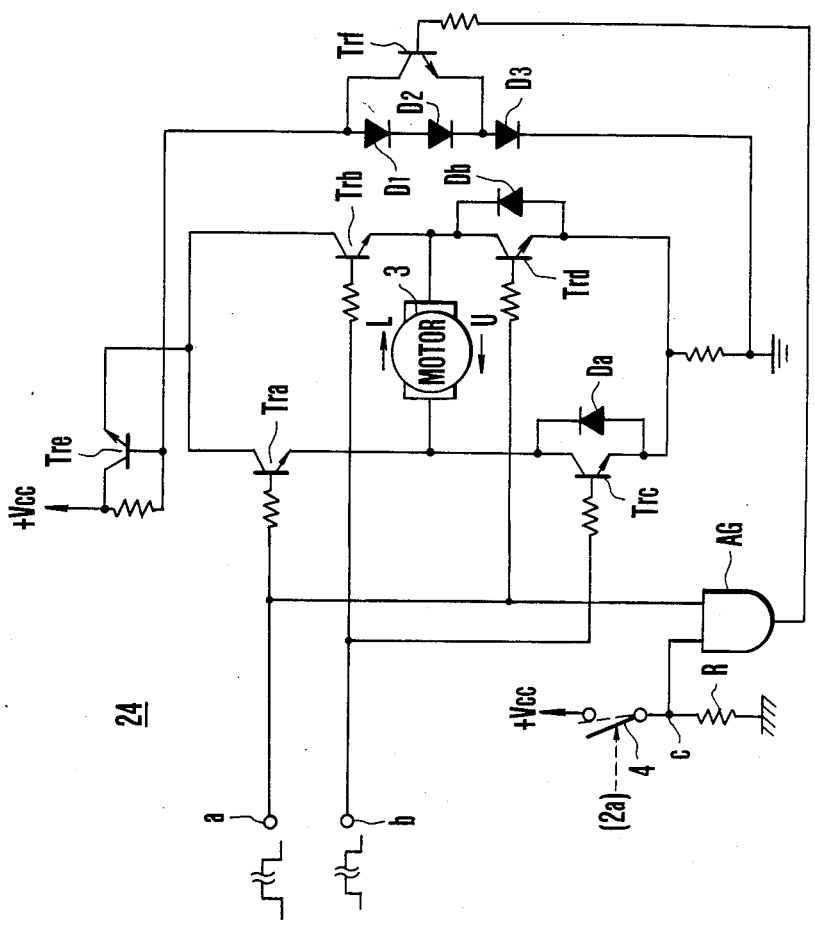
Figure 7:
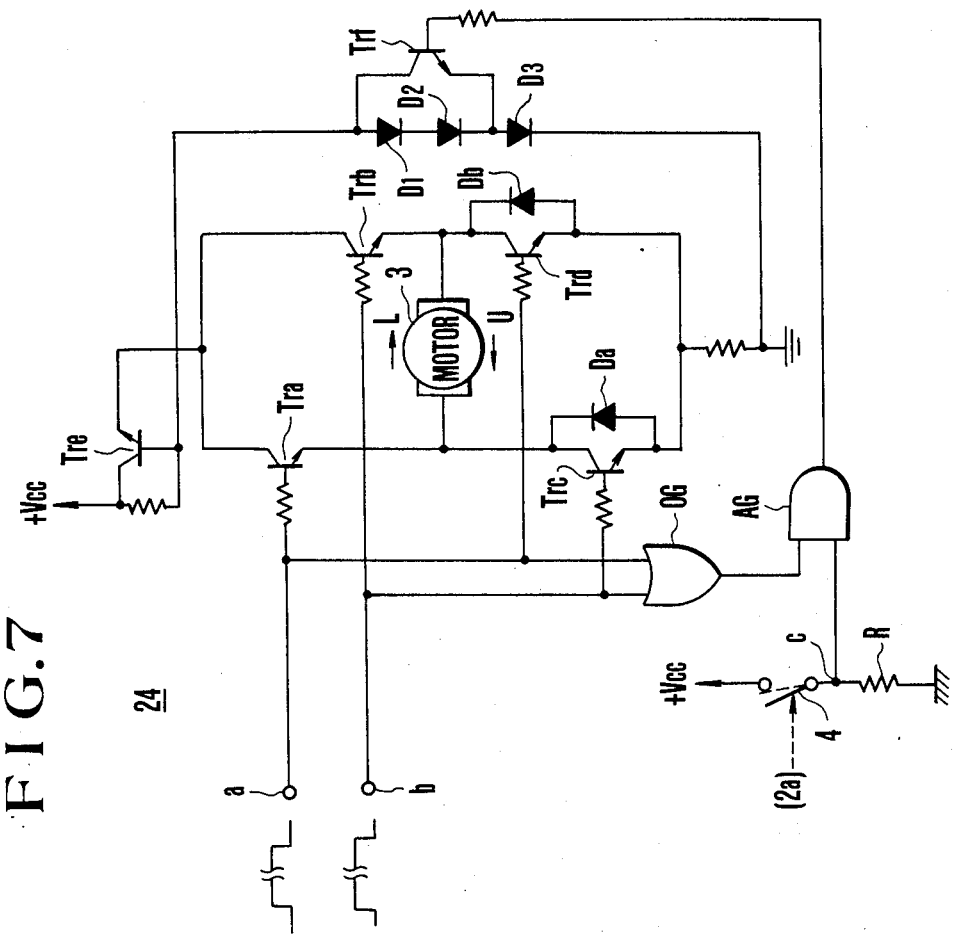

FIGS. 5, 6 and 7 show, by way of example, the arrangement of the control circuit 24 for the above-stated first, second and third embodiments.

Referring to FIGS. 5, 6 and 7, transistors Tra, Trb, Trc and Trd are arranged to pass and cut off the current for driving the loading motor 3. Transistors Tre and Trf are arranged to perform a decelerating action. Reference symbols Da, Db, D1, D2 and D3 denote diodes. The diodes D1, D2 and D3 are provided for obtaining the base current of the transistor Tre. A symbol AG denotes an AND gate. A symbol OG of FIG. 7 denotes an OR gate. The above-stated rotation range detecting switch 4 is, in this case, a normally-open type switch which is arranged to be turned on by the cam 2a of the loading ring 2 and is connected to a resistor R. The potential of a node "c" between the switch 4 and the resistor R is arranged to be applied to one of the input terminals of the AND gate AG. Of the transistors Tra-Trd, the diagonally arranged pair Tra and Trd and another pair Trb and Trc, respectively, have their bases connected in common within each paired arrangement. The bases of the transistors Tra and Trd are connected to a terminal "a" which receives a loading instruction signal, while the bases of the transistors Trb and Trc are respectively connected to a terminal "b" which receives an unloading instruction signal. The transistor Trf is arranged to have the two terminals of the diodes D1 and D2 short-circuited when it turns on and to have the base thereof connected to the output terminal of the AND gate AG.

(i) Control circuit of the first embodiment (FIG. 5):

Referring to FIG. 5 which shows, by way of example, the arrangement of the control circuit 24 of the first embodiment of this invention, the unloading instruction signal input terminal "b" is connected to the other input terminal of the AND gate AG.

With the control circuit 24 arranged in this manner, when a loading instruction signal (a high level signal) is applied to the loading instruction signal input terminal "a" in tape loading, the transistors Tra and Trd turn on while the transistors Trb and Trc remain off. This causes a current to flow through the motor 3 in the direction of arrow L. The motor 3 rotates in the loading direction and tape loading is performed. In this case, the output level of the AND gate AG remains low irrespective as to whether the rotation range detecting switch 4 is on or off. Therefore, the transistor Trf remains off. Accordingly, the base potential of the transistor Tre becomes a composite potential of the diodes D1, D2 and D3 to have a relatively large current flow through the transistor Tre. This causes the motor 3 to rotate at a relatively high speed.

In unloading, when an unloading instruction signal (a high level signal) is applied to the unloading instruction signal input terminal "b", the transistors Trb and Trc turn on while the transistors Tra and Trd remain off. A current flows through in the direction of arrow U to cause the motor 3 to rotate in the unloading direction and a tape unloading operation is performed. Since the output level of the AND gate AG remains low until the rotation range detecting switch 4 turns on, the transistor Trf is off. Therefore, the motor 3 rotates at a relatively high speed as mentioned in the foregoing. However, when the rotation range detecting switch 4 is turned on by the cam 2a of the loading ring 2, the output level of the AND gate AG becomes high. The transistor Trf, therefore, turns on to have the two terminals of the diodes D1 and D2 short-circuited. Accordingly, the base potential of the transistor Tre becomes the potential of the diode D3 alone, i.e. becomes lower than before. As a result, the current flowing through the transistor Tre becomes smaller to decelerate the rotation of the motor 3 accordingly.

(ii) Control circuit of the second embodiment (FIG. 6):

FIG. 6 shows, by way of example, the arrangement of the control circuit 24 of the second embodiment of this invention. In this case, the other input terminal of the AND gate AG is connected to the loading instruction signal input terminal "a". Therefore, as will be understood from the foregoing description, the motor 3 is decelerated only when the detecting switch 4 is turned on by the cam 2a in performing a loading operation.

(iii) Control circuit of the third embodiment (FIG. 7):

FIG. 7 shows, by way of example, the arrangement of the control circuit 24 of the third embodiment of this invention. In the case of the third embodiment, the output terminal of an OR gate OG, which is arranged to receive a loading instruction signal and an unloading instruction signal, is connected to the other input terminal of the AND gate AG. In this case, therefore, the motor 3 is decelerated both in loading and in unloading as long as the switch 4 is on.

Figure 8:
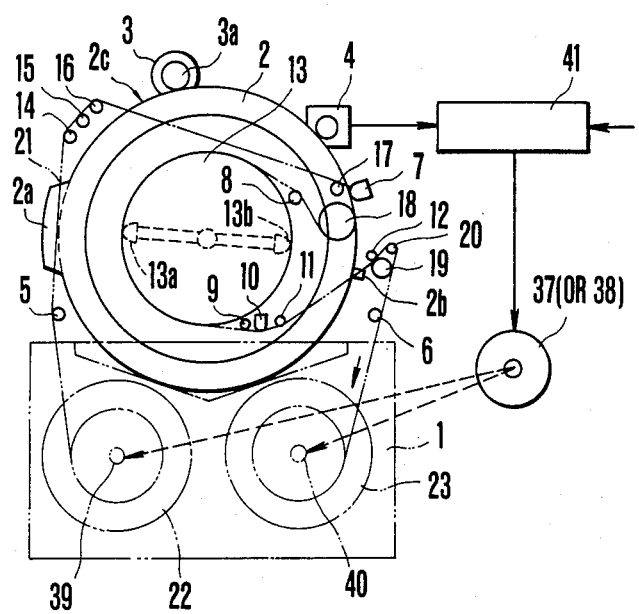
FIGS. 8, 9 and 10 are plan views showing a tape loading mechanism employed in a fourth embodiment of this invention as in the same varied states as those shown in FIGS. 1, 2 and 3.
Figure 9:
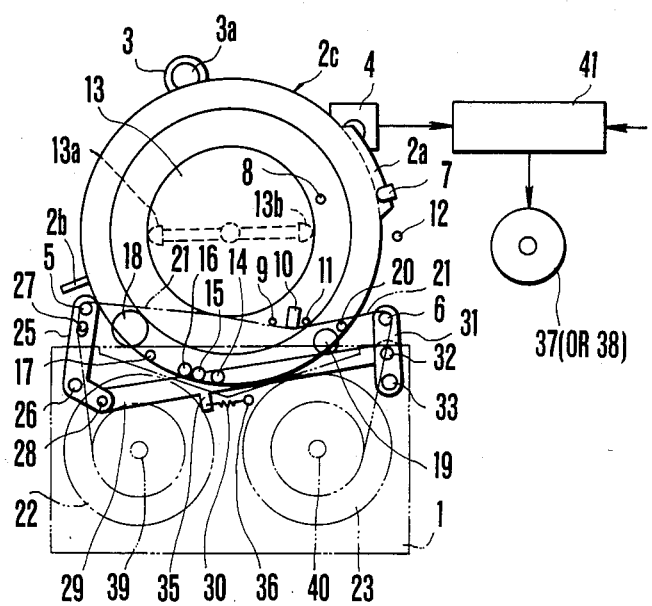
Figure 10:
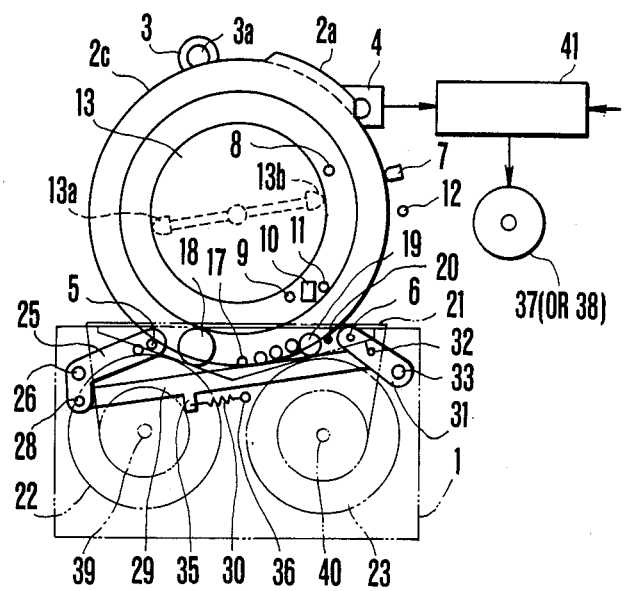
Figure 11:
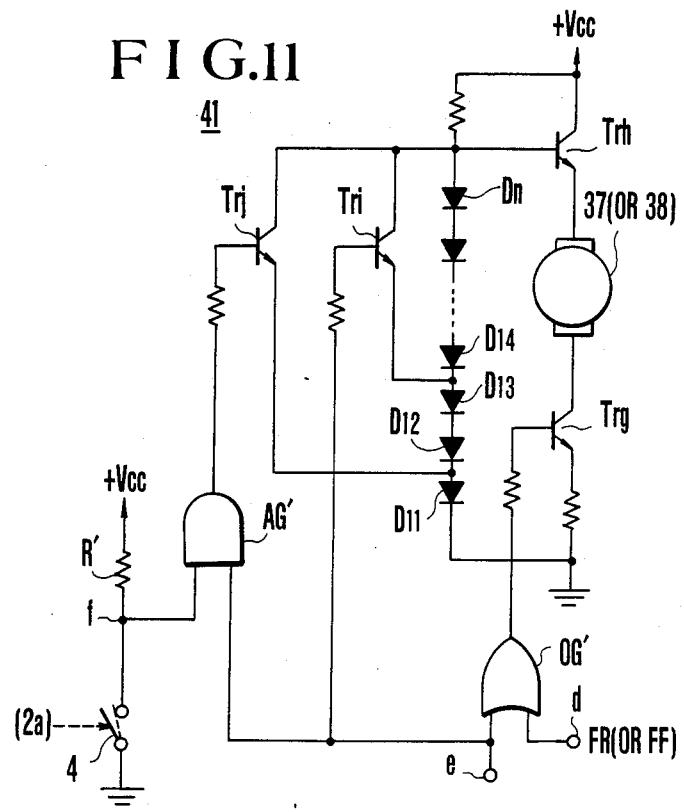
FIG. 11 is a circuit diagram showing a reel driving motor control circuit to be arranged in the fourth embodiment.

FIGS. 8-11 show a fourth embodiment of this invention. In the first and third embodiments described in the foregoing, the tape 21 is prevented from being slackened by the return movement of the tape guides 5 and 6 during unloading with the rotating speed of the loading ring 2 lowered to slow down the returning speed of the tape guides 5 and 6. Whereas, in the fourth embodiment, occurrence of slackening of the tape 21 due to the return movment of the tape guides 5 and 6 is prevented by increasing the tape winding or taking-up speed of the reel 22 and/or the reel 23. In FIGS. 8–10, the same reference numerals and symbols as those used in FIGS. 1–4 are used for denoting the parts performing the same functions. As will be understood from these drawings, the signal of the detecting switch 4 is arranged to be applied to a reel motor control circuit 41 which is arranged to control a reel drive motor 37 or 38. The reel motor control circuit 41 is arranged, for example, as shown in FIG. 11.

Referring to FIG. 11, the control circuit 41 includes a transistor Trg which is arranged to control starting and stopping of the reel motor 37 or 38. A terminal "d" is arranged to receive a tape fast rewinding (FR) instruction or a tape fast forwarding (FF) instruction. Another terminal "e" is arranged to receive an unloading instruction. An OR gate OG' is arranged to receive the FR or FF instruction from the terminal "d" and the unloading instruction from the terminal "e". The transistor Trg is under the control of the output of the OR gate OG'. Transistors Trh, Tri and Trj are provided for effecting deceleration. An "n" number of diodes D11-Dn are series connected for obtaining the base potential of the transistor Trh. The transistor Tri is arranged to short-circuit the diodes D14-Dn among the series arrangement of the diodes D11-Dn. The transistor Tri is controlled by the unloading instruction applied to the terminal "e". The transistor Trj is arranged to short-circuit the diodes D12-Dn among the diodes D11-Dn and is controlled by the output of an AND gate AG'. The AND gate AG' is arranged to recieve at one input terminal thereof the unloading instruction applied to the terminal "e" and to receive at the other input terminal the potential of a node "f" between the detecting switch 4 and a resistor R'.

The operation in unloading of the fourth embodiment which is arranged as described above is as follows: The loading motor 3 causes the loading ring 2 to rotate counterclockwise, the loading posts 17, 18 and 20, the pinch roller 19, the moving posts 14, 15 and 16 and the movable tape guides 5 and 6 also move accordingly. The tape path is shortened by this.

In unloading, the unloading instruction applied to the terminal "e" causes the output level of the OR gate OG' to become high. The transistor Trg turns on. The detecting switch 4 remains off until the loading ring 2 reaches its position as shown in FIG. 9. Therefore, with the unloading instruction applied to the terminal "e", the output level of the AND gate AG' becomes high. This causes the transistor Trj to turn on. Accordingly, the diodes D12-Dn are short-circuited. As a result of this, the transistor Trh comes to have the diode D11 alone connected to the base thereof. The base potential of the transistor Trh thus becomes low to have a small current flow therethrough. Therefore, the reel driving motor 37 or 38 operates at a low speed to cause the reel to take up the tape 21 for unloading.

With the unloading operation thus started, when the loading ring 2 reaches the position of FIG. 9, that is, when it comes to a point where the tape guides 5 and 6 begin to make their return movements, the detecting switch 4 is turned on by the cam 2a of the loading ring 2. This causes the output level of the AND gate AG' to become low. The transistor Trj, therefore, turns off. Meanwhile, the transistor Tri is turned on by the unloading instruction. With the detecting switch 4 turned on to turn off the transistor Trj, therefore, the transistor Tri becomes active to short-circuit the diodes D14-Dn. As a result of this the transistor Trh comes to have the diodes D11-D13 connected to the base thereof. The base potential of the transistor Trh thus becomes higher to have a larger current flow therethrough. The larger current then increases the operating speed of the motor 37 or 38. Thus, while the path of the tape 21 is greatly changed by the return movement of the tape guides 5 and 6, the tape comes to be taken up also in a greater amount, so that the tape 21 can be prevented from slackening.

Upon completion of tape unloading, the unloading instruction disappears. The transistors Trg and Tri turn off and the operation of the embodiment comes to an end.

In fast rewinding or fast forwarding the tape 21, the FR (or FF) instruction is applied to the terminal "d". This causes the output level of the OR gate OG' to become high and the transistor Trg to turn on. In this instance, both the transistors Tri and Trj are off. Therefore, the transistor Trh has all the diodes D11-Dn connected to the base thereof. The base potential of the transistor Trh thus becomes very high. A large current is thus supplied to the motor 37 or 38 to cause it to rotate at a high speed. The tape 21 is, therefore, rewound or advanced at a high speed.

Both the motors 37 and 38 may be separately provided with the circuit of FIG. 11. In case where the circuit of FIG. 11 is provided solely for the motor 38 which is arranged to drive the reel 23, an additional control circuit may be provided for controlling the motor 38 during a recording or reproducing operation.

The fourth embodiment, of course, may be arranged in combination with the first, second and third embodiments described in the foregoing.

In the embodiments given, this invention is applied to VCRs. However, the invention is applicable not only to VCRs but also to apparatuses of other kinds. For example, the invention is applicable to an audio cassette recorder arranged to record and/or reproduce an audio signal with a magnetic tape in a state of pulled out of a tape cassette. Changes and variations of the described embodiments may be made without departing from the spirit or scope of the following claims.

What is claimed is:

1. A recording and/or reproducing apparatus using an extractable tape shaped record bearing medium housed in a container having wind-up means for winding up the medium, said apparatus comprising:
   (A) signal recording and/or reproducing means for recording signals on and/or reproducing recorded signals from the medium;
   (B) loading means for loading said recording and/or reproducing means with the medium, said loading means being movable between a loading position in which a portion of the medium is outside the container and an unloading position;
   (C) guide means for guiding the medium at the outside of the container, said guide means being movable between a predetermined effective guiding position outside of the container and a predetermined ineffective guiding position inside of the container in response to the movement of said loading means between said loading position and said unloading position;
   (D) first drive means for moving said loading means between said loading position and said unloading position;
   (E) second drive means for causing the wind-up means to wind up the medium; and
   (F) control means for changing a moving speed of said loading means in response to the movement of the loading means.

2. The apparatus according to claim 1, wherein said control means includes :
   a detecting member for detecting a movement range of said loading means which causes the movement of said guide means; and
   a control circuit for decreasing a driving speed of said first drive means in respose to said detecting member.

3. A video signal recording and/or reproducing apparatus using a video tape cassette which houses a magnetic video tape and a pair of reels for winding up the tape, said apparatus comprising:

(A) a rotary drum assembly having rotatable magnetic heads for recording video signals on and/or reproducing recorded video signals from the tape;

(B) a tape loading mechanism for wrapping a portion of the tape around said drum assembly, said loading mechanism including at least one movable loading member which is movable between a predetermined loading position outside of the cassette and a predetermined unloading position inside of the cassette, said movable loading member passing through a predetermined intermediate position;

(C) a tape guide mechanism for guiding a portion of the tape outside of the cassette, said guide mechanism including at least one movable guide member which is operatively associated with said loading mechanism and is movable between a predetermined effective guiding position outside of the cassette and a predetermined ineffective position inside of the cassette in response to the movement of said loading member between said intermediate position and said unloading position, the moving speed of the guide member being dependent upon the moving speed of the loading member between the intermediate position and the unloading position;

(D) first driving means for driving said loading mechanism to move said loading member between said loading position and said unloading position;

(E) second driving means for driving at least one of the reels to wind up the tape; and (F) control means for decreasing the moving speed of said loading member between said intermediate and said unloading positions.

4. The apparatus according to claim 3, wherein said control means includes;

a detecting member for detecting that said loading means is positioned between said intermediate and said unloading positions; and a control circuit for decreasing the driving speed of said first drive means in response to said detecting member.

* * * * *